(No Model.)

E. BARRATH.
ADJUSTABLE CRANK SHAFT.

No. 303,790. Patented Aug. 19, 1884.

WITNESSES:
Chas. Nida
C. Sedgwick

INVENTOR:
E. Barrath
BY Munn & Co
ATTORNEYS.

UNITED STATES PATENT OFFICE.

EDWARD BARRATH, OF BROOKLYN, NEW YORK.

ADJUSTABLE CRANK-SHAFT.

SPECIFICATION forming part of Letters Patent No. 303,790, dated August 19, 1884.

Application filed January 9, 1884. (No model.)

*To all whom it may concern:*

Be it known that I, EDWARD BARRATH, of Brooklyn, in the county of Kings and State of New York, have invented a new and Improved Adjustable Crank-Shaft, of which the following is a full, clear, and exact description.

Reference is to be had to the accompanying drawings, forming a part of this specification, in which similar letters of reference indicate corresponding parts in all the figures.

Figure 1:
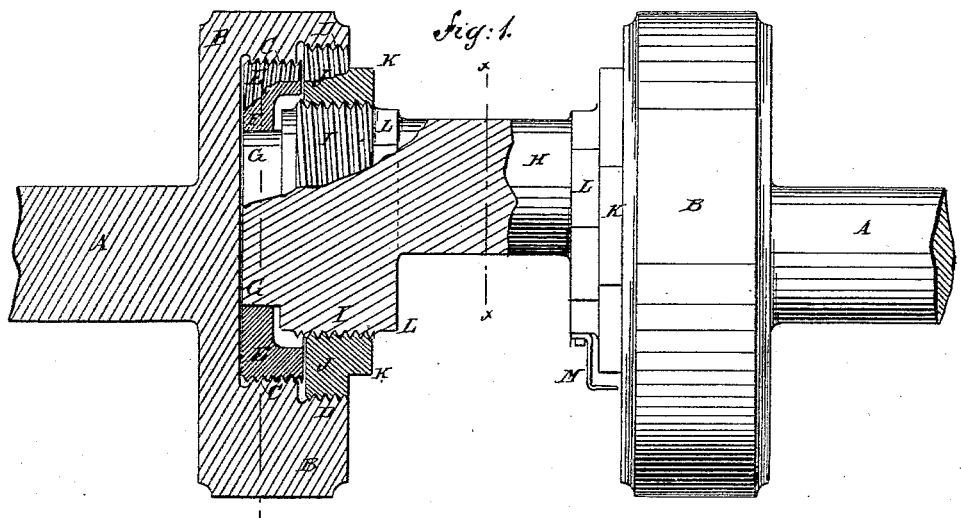
Figures 2, 3:
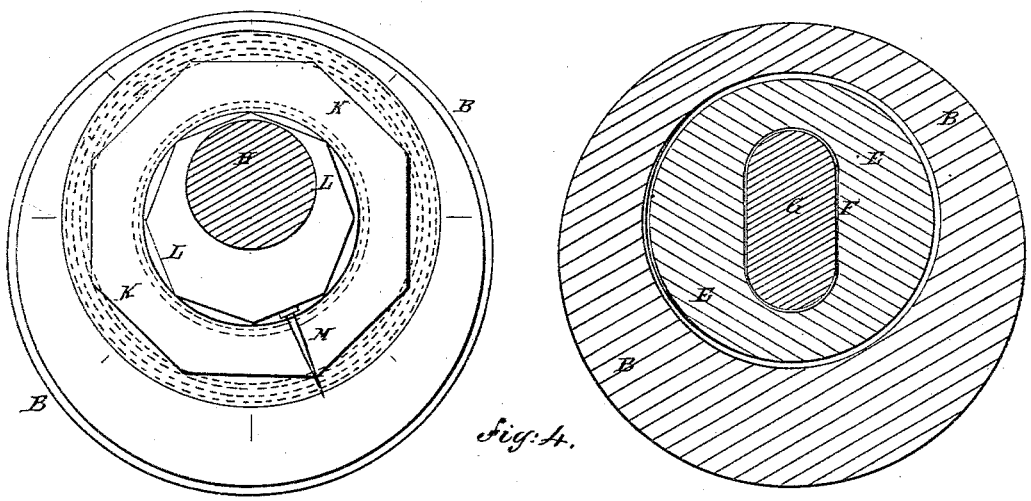
Figure 4:
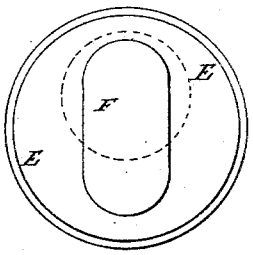

Figure 1 is a side elevation, partly in section, of my improvement. Fig. 2 is a sectional end elevation of the same, taken through the line $x\,x$, Fig. 1. Fig. 3 is a sectional end elevation of the same, taken through the line $y\,y$, Fig. 1. Fig. 4 is a plan view of the male screw.

The object of this invention is to provide crank-shafts so constructed that they can be readily and accurately adjusted to give any desired throw to the crank.

The invention consists in an adjustable crank-shaft constructed with shaft-sections having upon their adjacent ends heads provided with eccentric female screws having different diameters and reverse screw-threads, the male screws having oblong openings to receive the ends of the crank, the screws having exterior and interior screw-threads to screw into the female screws of the heads and upon the ends of the crank, and the crank having oblong ends and male screw-threads, so that the crank can be readily adjusted and will be securely held. The crank is provided with an index pointing to division-marks on the head of the shaft-section, so that the throw of the shaft will be accurately indicated, as will be hereinafter fully described.

A represents the parts of the shaft upon the adjacent ends of which are formed circular heads B. In the adjacent faces of the heads B are formed female screws C, eccentric to the axis of the shaft A. The screw C of one head B is made with a left-hand thread, and the screw C of the other head is made with a right-hand thread. In the adjacent faces of the heads B is formed a second pair of female screws, D, concentric with and of a larger diameter than the female screws C, as shown in Fig. 1. One of the screws D is made with a right-hand thread and the other with a left-hand thread, and the screws C D of each head B are oppositely cut or formed, respectively, with right and left hand threads.

E is a male screw the thread of which fits into the thread of the female screw C, and which has an oblong hole, F, through its center to receive the oblong end G of the crank H. Upon the crank H, adjacent to the oblong ends G, are formed male screws I, which are concentric with the said oblong ends G, and eccentric with the shaft A and the arm of the crank H. One of the screws I has a right-hand thread and the other a left-hand thread at opposite heads B.

J is a screw having an exterior thread fitting into the female screw D, and an exterior thread fitting upon the male screw I. One of the screws J has right-hand threads and the other left-hand threads at opposite heads B. With this construction the threads of the corresponding parts at the two ends of the crank H are the reverse of each other.

Upon the projecting outer parts of the screws J are formed polygonal shoulders K, to receive a wrench for turning the said screws in and out, and upon the crank H, at the outer ends of the screws I, are formed polygonal shoulders L, to receive a wrench for adjusting the said crank. With this construction, when the crank is to be adjusted to vary its throw, a wrench is applied to the shoulders K, and the screws J are turned out. The wrench is then applied to the shoulders L, and the crank H is turned into the desired position, the oblong ends G turning the male screws E in the female screws C. The screws J are then screwed in, the crank H being held stationary, and act as jam-nuts to lock the screws E and the crank H in place; or, the screw J and crank H can be turned at the same time by using two wrenches, one upon the shoulder K and the other upon the shoulder L.

To the shoulder L of the crank H is attached an index, M, which passes over the screw J, and points to a scale of division-marks formed upon the face of the head B, to indicate the position of the crank H, and thus facilitate the adjustment. With this construction the crank H can be conveniently and accurately adjusted to give the exact throw required.

Having thus described my invention, I claim as new and desire to secure by Letters Patent—

1. An adjustable crank-shaft constructed substantially as herein shown and described, and consisting of the shaft-sections having heads provided with eccentric female screws of different diameters and reverse screw-threads, the male screw having oblong central opening, the screw having exterior and interior screw-threads, and the crank having oblong ends and male screw-threads, as set forth.

2. In an adjustable crank-shaft, the combination, with the shaft-sections A, having heads B, provided with eccentric female screws C D of different diameters and reverse screw-threads, of the male screw E, having oblong perforations, the crank H, having oblong ends G and male screws I, and the screws J, having exterior and interior threads, substantially as herein shown and described, whereby the crank can be readily adjusted and will be securely held, as set forth.

3. In an adjustable crank-shaft, the combination, with the shaft-sections A, having heads B, and the crank H, of the index M, substantially as herein shown and described, whereby the throw of the crank will be indicated, as set forth.

EDWARD BARRATH.

Witnesses:
JAMES T. GRAHAM,
EDGAR TATE.